May 28, 1935.  I. LEWIN ET AL  2,002,953
ADJUSTABLE DEVICE FOR LOOMS AND METHOD OF
CONTROLLING THE BEATING-UP OPERATION
Filed Oct. 11, 1933  8 Sheets-Sheet 1
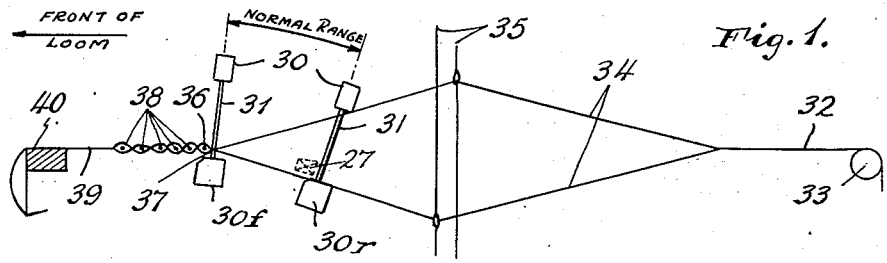
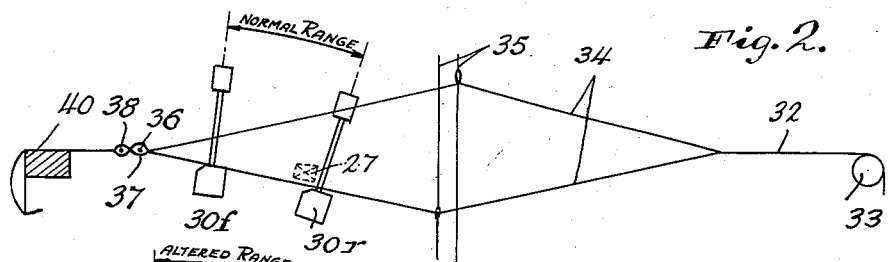
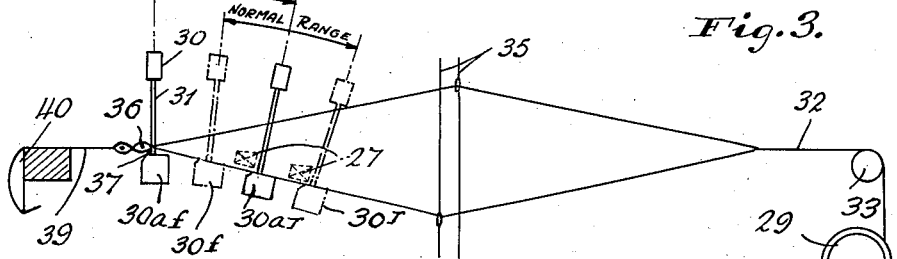
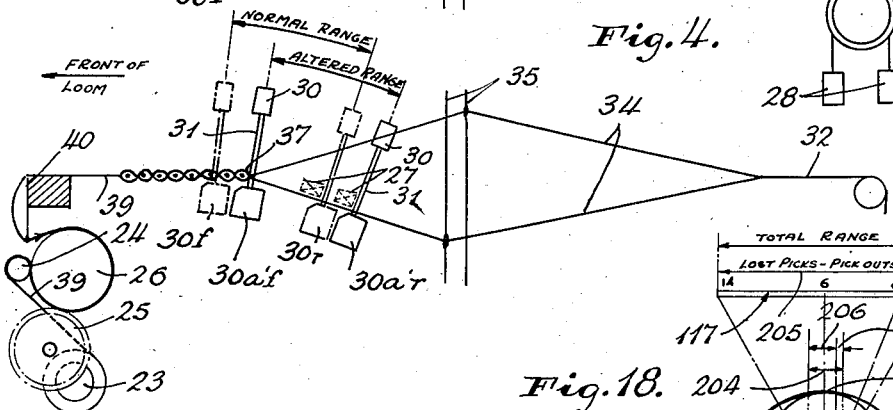
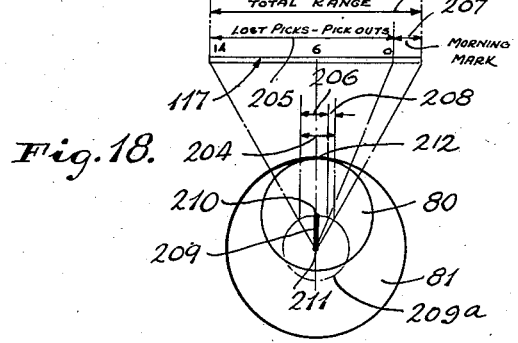
INVENTORS
IRVING LEWIN
CONRAD W. GEIER
BY
ATTORNEYS

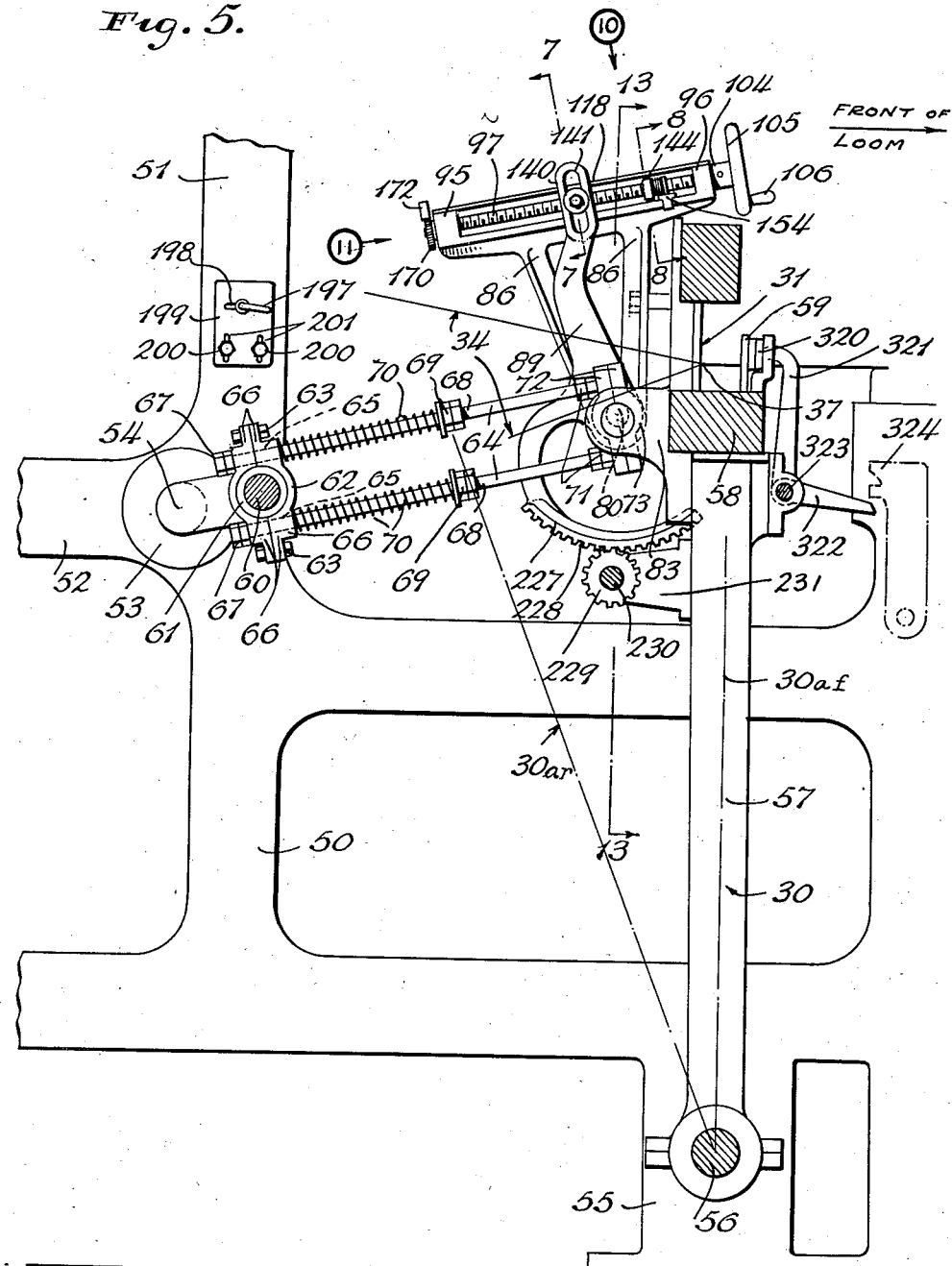

May 28, 1935.
I. LEWIN ET AL
2,002,953
ADJUSTABLE DEVICE FOR LOOMS AND METHOD OF CONTROLLING THE BEATING-UP OPERATION
Filed Oct. 11, 1933
8 Sheets-Sheet 3
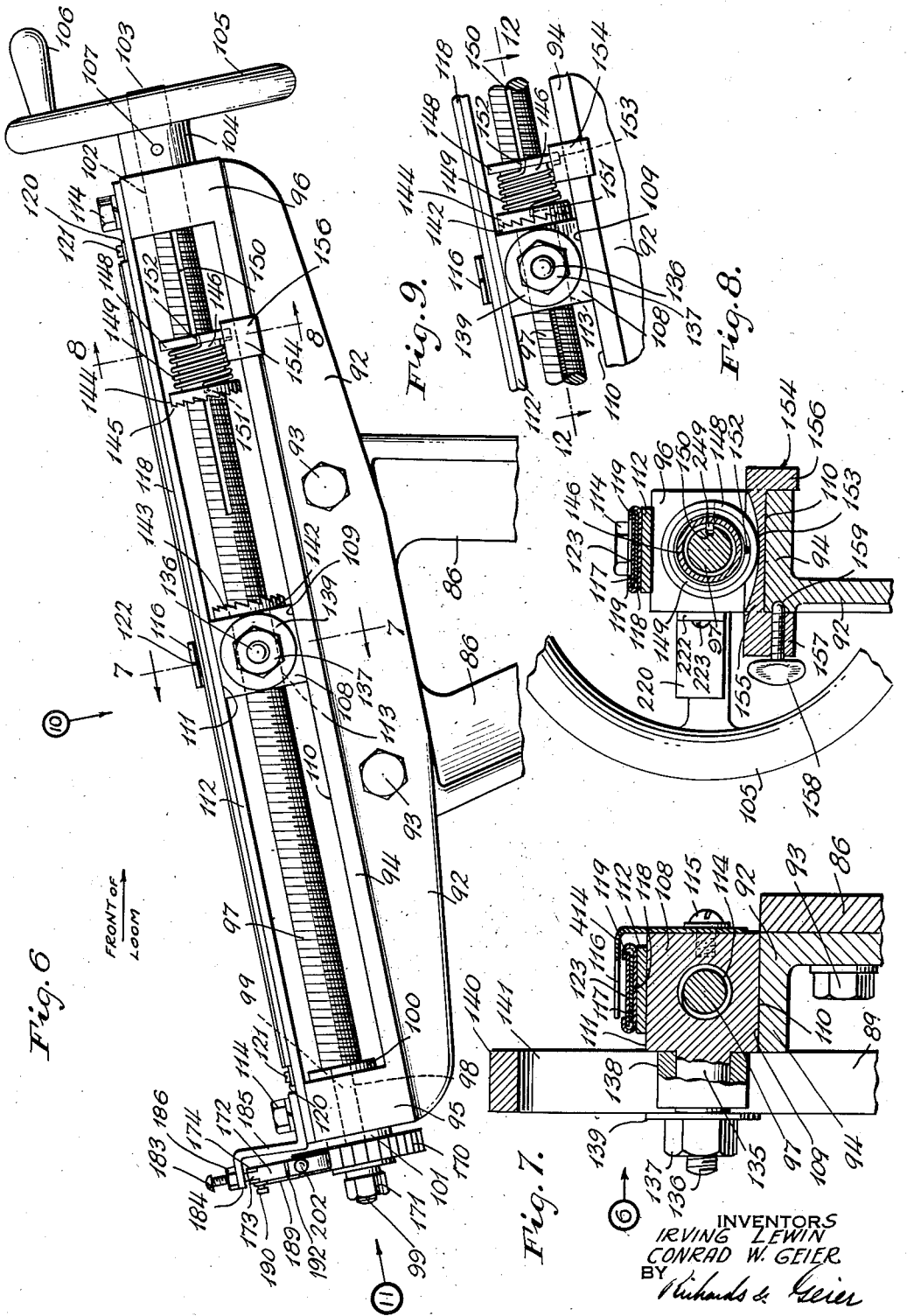
INVENTORS
IRVING LEWIN
CONRAD W. GEIER
BY
ATTORNEYS May 28, 1935.  I. LEWIN ET AL  2,002,953
ADJUSTABLE DEVICE FOR LOOMS AND METHOD OF
CONTROLLING THE BEATING-UP OPERATION
Filed Oct. 11, 1933     8 Sheets-Sheet 4
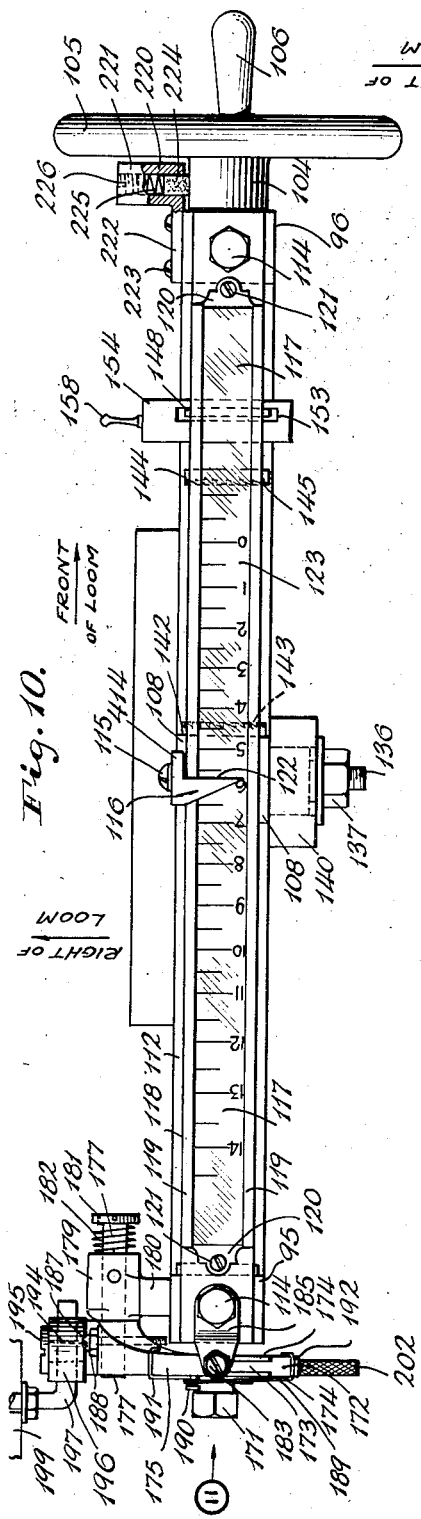
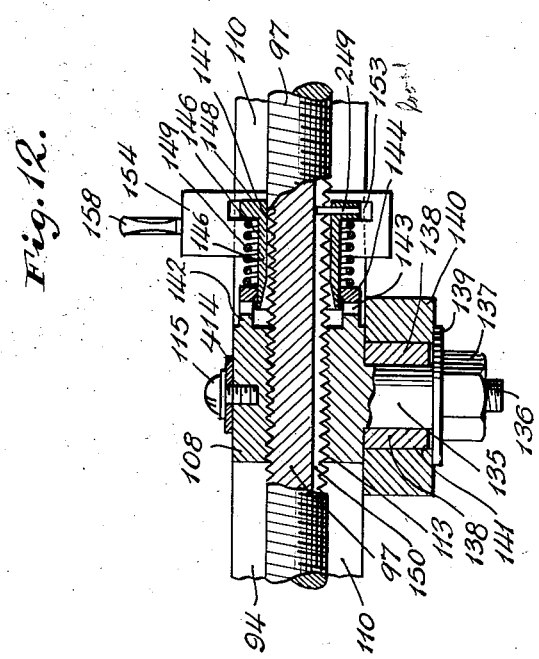
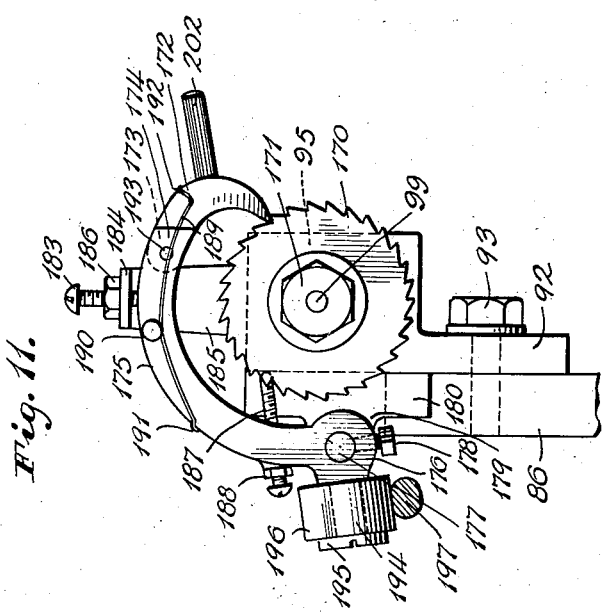
INVENTORS
IRVING LEWIN
CONRAD W. GEIER
BY
ATTORNEYS

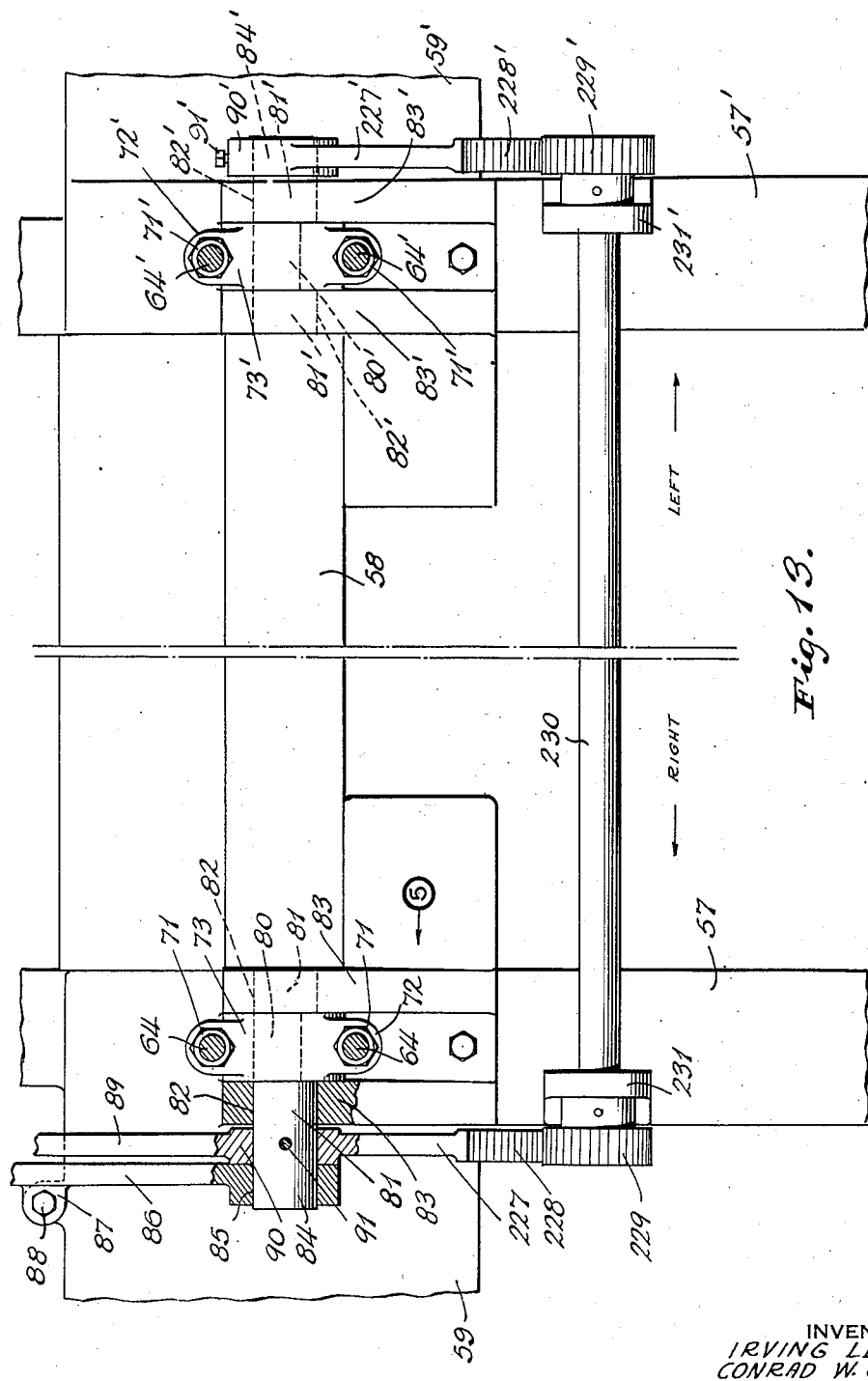

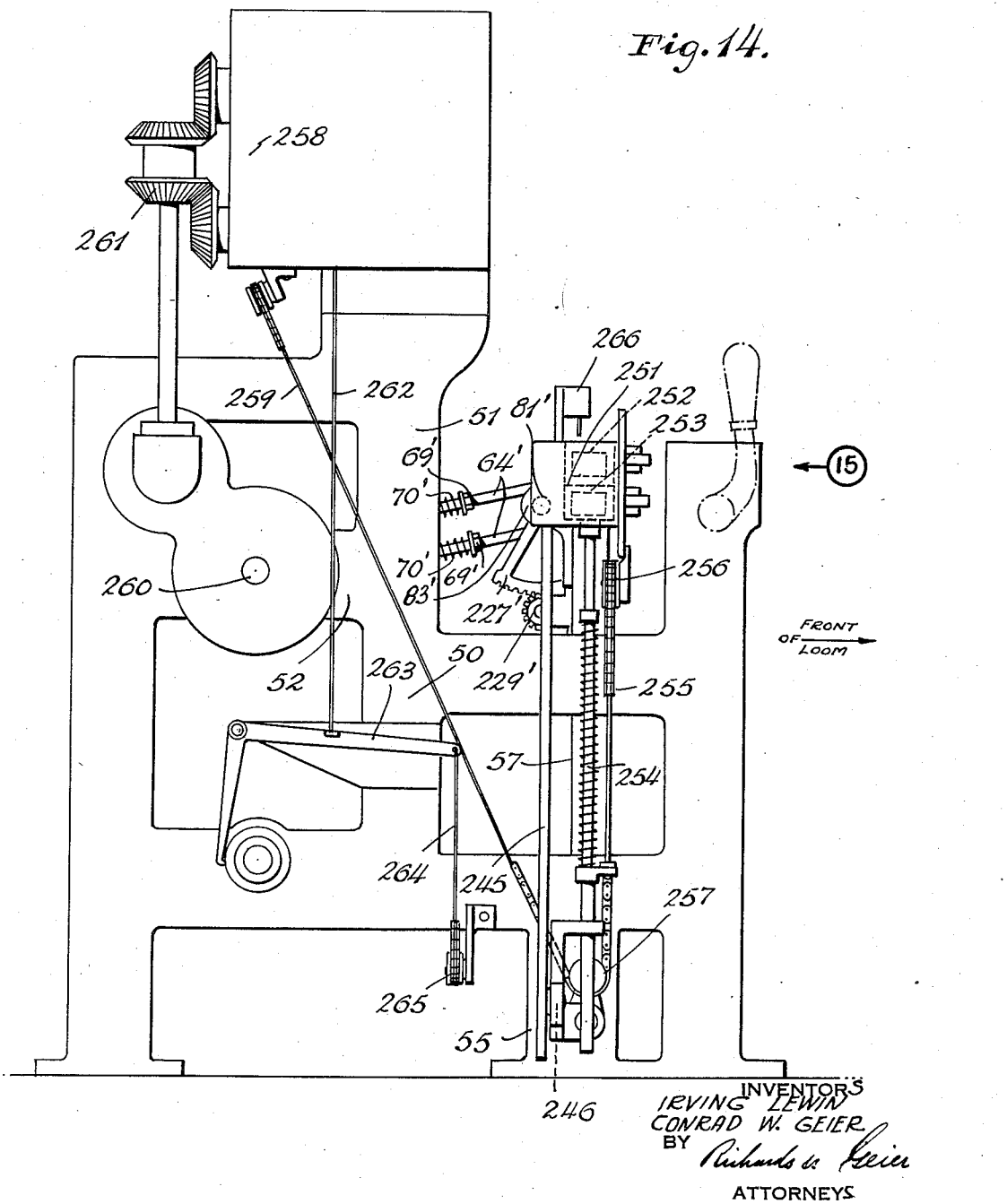

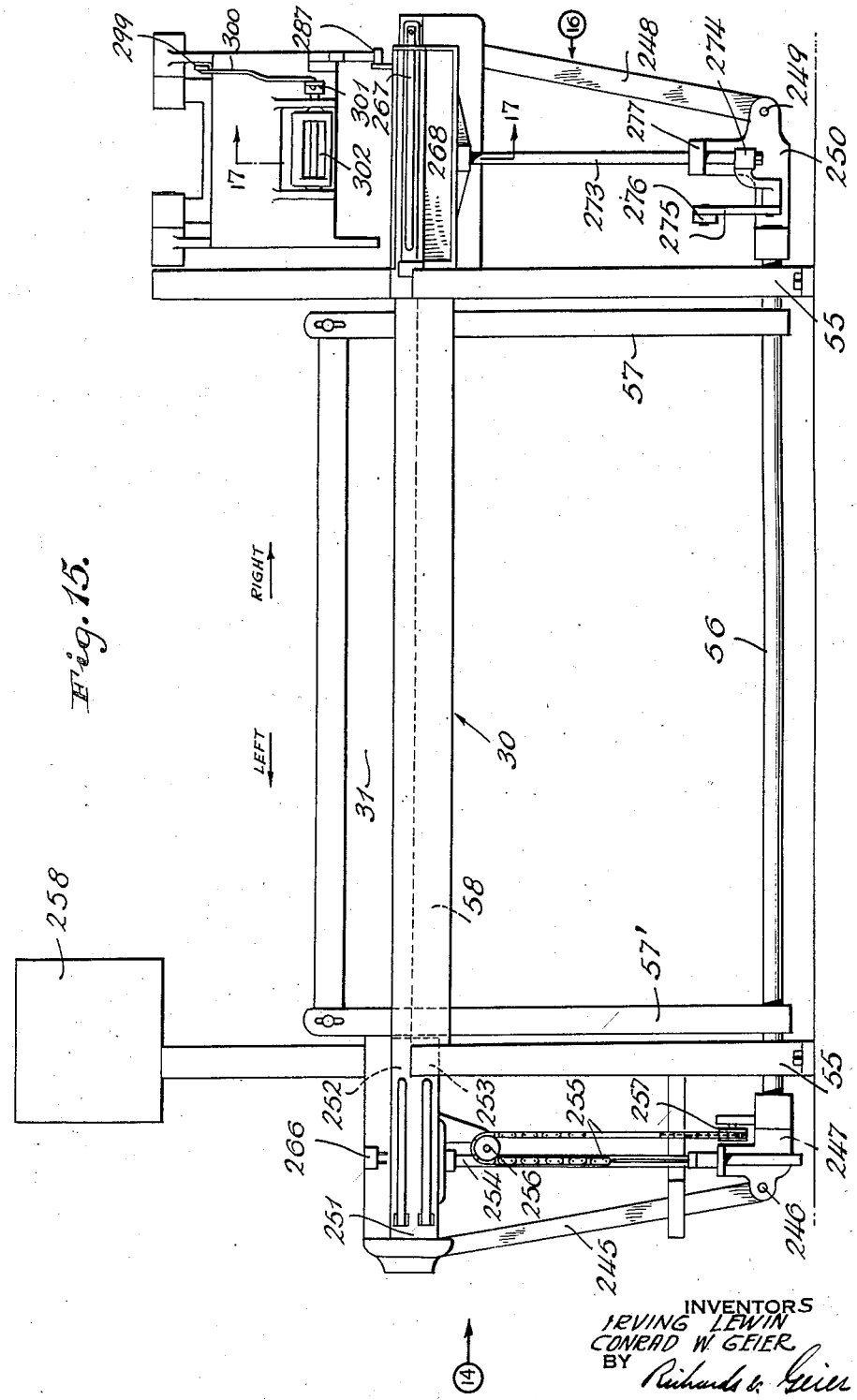

May 28, 1935.  I. LEWIN ET AL  2,002,953
ADJUSTABLE DEVICE FOR LOOMS AND METHOD OF
CONTROLLING THE BEATING-UP OPERATION
Filed Oct. 11, 1933    8 Sheets-Sheet 8

INVENTORS
IRVING LEWIN
CONRAD W. GEIER
BY
ATTORNEYS

Patented May 28, 1935

2,002,953

UNITED STATES PATENT OFFICE 2,002,953

ADJUSTING DEVICE FOR LOOMS AND METHOD OF CONTROLLING THE BEATING-UP OPERATION

Irving Lewin and Conrad Walter Geier, Hazleton, Pa., assignors to Duplan Silk Corporation, New York, N. Y., a corporation of Delaware Application October 11, 1933, Serial No. 693,086

22 Claims. (Cl. 139—190)

This invention relates to improvements in looms and has particular reference to the beating-up device and the method of controlling the same when making a joining or adjustment of picks in the cloth.

In looms of standard construction, the lay and especially the reed carried thereon reciprocate and move forwardly after each shuttle operation to beat the filling or weft threads placed in the shed by the shuttle into position at the fell of the cloth. In the standard loom, particularly broad silk looms, the reciprocation of the beating-up device, (that is the reed and/or the lay) is confined to a certain unchangeable range of motion, with a fixed extreme forward or foremost position at the normal fell position.

Incidental to each beating-up operation the woven cloth or fabric is moved forwardly the distance of one pick upon the take-up roll, which may be actuated, for example, by a ratchet wheel moved forwardly one or more teeth for each beating-up operation.

When the filling or weft of a shuttle becomes exhausted and/or when a weft breakage occurs, a pick-out of one or more weft threads is necessitated depending upon the order and arrangement of the weft or filler threads.

To correct this it has been the common practice for the loom operator to move the warp and the woven cloth rearwardly, so that the subsequent weft or filling threads will be beat up to proper position. However, this will disadvantageously affect the contact between the woven cloth and the take-up roll and also the warp tension with resultant imperfections in the cloth.

This adjustment is usually done by the loom operator, after the loom has been stopped. After making the pick-outs the operator manually adjusts the lay, and consequently the reed, to the forward extremity of its fixed range of movement and then lets the cloth backward in the direction of the let-off to position the fell of the cloth so that it will coincide with said extreme forward position of the reed.

Notwithstanding the expertness of the operator, this operation has been found to result in uncertainty in the adjustment or setting of the woven cloth and the warp due to slippage and change of tension of the warp threads and the woven cloth with respect to the take-up and let-off mechanisms, and the inexactness of the adjustment of the fell of the cloth relative to the extreme forward position of the reed.

For example, when attempting to make an adjustment of the woven cloth or the warp, the weaver must very carefully bring the reed to its forward limit in order to determine where the fell of the cloth should be, and must then, with equal care, let the cloth back to meet the reed. In either operation, any inaccuracy in these minute adjustments, both of which are extremely difficult to make, may result in the last inserted pick being moved out of place and crowded against adjacent picks so that a "heavy mark" or imperfection in the cloth will be produced. On the other hand, should the operator fail to let the cloth back quite far enough, the filling threads will be too loose and an imperfection known as a "light mark" will be created.

The necessity of making adjustments of the cloth in order to avoid imperfections therein also occurs after a loom has remained idle for any length of time, such as overnight.

Due to climatic conditions and/or the tension applied to the warp, the latter oftentimes stretches or shrinks, according to the characteristics of the yarn in the warp, during any prolonged inactivity of the loom.

It thereupon becomes essential that the operator, before again starting the loom, very carefully move the lay toward its extreme forward position so as to bring the reed up to the fell of the cloth to determine whether such stretch or shrinkage has occurred. When this has been accomplished and it has been found that the warp or cloth has stretched or shrunk the latter is adjusted relative to the reed, either forward or backward as the case may be, until the fell coincides with the extreme forward position of said reed.

Thus, in all instances of adjustments relative to the normal fell of the cloth, which are made to avoid imperfections in the woven material, it has been substantially universal practice to move the cloth to shift the altered fell thereof relative to the reed with the attendant disadvantages above pointed out. This movement of the cloth brings about a very disturbed condition of the warp, whether it be silk, wool, cotton, rayon or any other fibre, or whether it be any of the above-mentioned fibres which have been prepared with a greater or lesser number of turns per inch necessitated by some particular effect which the manufacturer is desirous of obtaining in the finished fabric.

An object of the present invention is to provide means and method of controlling the beating-up of the weft threads, which will correct for the alteration in position of the fell consequent to lost picks, pick-outs and stretching and shrinkage of the warp, which means and method will maintain an undisturbed condition between the cloth and the warp, and the take-up and let-off mechanisms and assure a uniform fabric with substantial elimination of "heavy" or "light" marks.

Another object of the present invention is to provide means and method of controlling the beating-up of the weft threads which will correct for the alteration in position of the fell consequent to lost picks, pick-outs and stretching and shrinkage of the warp, which means and method may be actuated by simple manual operation on the part of the loom operator upon stoppage of the loom without delicate adjustments or exercise of a great amount of skill on the part of the operator to accommodate any normally occurring alteration of the position of the fell, said means being of relatively simple and inexpensive construction and being of a construction conveniently connected to looms of usual form without any substantial change therein, or reconstruction thereof.

To accomplish this and other objects, use is made of a mechanism or device by which the reed, the lay and/or other beating-up device may be adjusted to various positions, either forwardly or backwardly relative to the fell of the cloth, to thereby shift the extreme forward and backward range of the reed, this being preferably done without altering the length or arc of movement thereof.

The amount of adjustment of the reed is dependent upon the number of picks lost or removed, and/or the extent of the stretch or shrinkage of the warp or cloth, and by the use of such a mechanism, the throw of the reed with respect to the fell of the cloth is altered without affecting or changing the position or tension of the warp, and the fabric, in respect to either the let-off or take-up mechanisms.

While various means for adjusting the beating-up device or the reed may be employed in carrying out the invention, the present preferred embodiment of such means consists in using an eccentric pin which joins the driving means, such as the crank connector, to the lay structure or lay sword so that the foremost position of the reed will be changed to correspond to a changed fell position.

However, it is to be understood that the inventive concept is not to be construed as limited to the specific mechanism shown herein since the same result can be obtained through the use of other instrumentalities such as screws, wedges, cams, worms or other adjusting means, or by an adjustment of the reed and/or shuttle boxes relative to the lay structure itself.

In actuating the adjusting device and in controlling the beating-up operation to accommodate said lost picks, pickouts and shrinking or stretching of the warp, it is most desirable that the loom operator accomplish this without undue stoppage of the loom with a maximum of convenience, and it is a further object of the present invention to provide a readily accessible and conveniently manipulated control by which the adjustment may be made simultaneously on both sides of the loom, said control being provided with suitable indicator arrangements so that the operator may quickly determine the amount of adjustment to be made and the exact relationship of the beating-up device in respect to the fell of the fabric.

It is desirable that the beating-up device, either the lay or the reed, be actuated or returned to its normal position subsequent to adjustment to accommodate altered fell positions due to lost picks, pick-outs, shrinkage, and/or stretching of the warp and woven fabric, and it is a further object of the present invention to provide an automatic return, which, subsequent to the adjusting operation, will return the lay and reed to its normal range and to its normal foremost position, without affecting the uniformity of the beating-up or spacing of the weft or filler threads and without requiring any attention from the loom operator.

In combining the adjusting means and method of the present application with looms and particularly with automatic looms it is desirable that the amount of movement of the lay and/or the reed in making the adjustments above described will not affect the safety mechanisms such as the dagger throw-off and/or the automatic shuttle box, shuttles and/or bobbins or quill changing devices, and it is a further object of the present invention to so co-ordinate the adjusting means and method of the present invention with looms, and particularly with automatic looms, that the total magnitude of the adjustment will not cause a premature throw-off of the loom due to an altered dagger position, nor will it cause a derangement of the automatic shuttle box, shuttle and/or bobbin or quill changing operation because of an altered relationship between the lay and the loom frame at different positions in the reciprocation of the lay, at which positions the changing mechanism is actuated and/or the fresh shuttle boxes, shuttles or bobbins are transferred from the magazine to the lay or the exhausted ones from the lay to the relatively fixed magazine for the exhausted members.

The inventive idea involved is therefore capable of receiving a variety of mechanical expressions, one of which, for purposes of illustration, is shown in the accompanying drawings wherein:

Figures 1 to 4 are diagrammatic side views of a loom, Fig. 1 illustrating the normal operation of the reed and its range of movement, Fig. 2 illustrating the relative position of the reed and the lay after pickouts or lost picks, Fig. 3 illustrating the altered range of movement of the lay after adjustment has been made to accommodate the alteration in fell of Fig. 2, and Fig. 4 illustrates the altered fell due to shrinkage of the warp, as for example because of standing overnight, together with the altered position of the lay because of such shrinkage.

Figure 5 is a side sectional view of the loom with the adjusting device of the present invention assembled thereupon.

Figure 6 is a fragmentary side view of the adjusting device as shown in Fig. 5, upon an enlarged scale.

Figures 7 and 8 are transverse sectional views of the adjusting device upon the lines 7—7 and 8—8 of Fig. 6.

Figure 9 is a side view of a detail of Fig. 10 showing the position of the parts of the adjusting device when the lay is moving through its normal range.

Figure 10 is a top view of the adjusting device taken in the direction indicated by the arrow 10 of Figs. 5 and 6.

Figure 11 is a rear view of the adjusting device taken in the direction indicated by the arrow 11 in Figs. 6 and 10.

Figure 12 is a longitudinal sectional view of the adjusting device taken upon the line 12—12 of Figure 9.

Figure 13 is a fragmentary sectional view upon an enlarged scale taken upon the line 13—13 of Figure 5, illustrating the connection between the sides of the lay so that both may be adjusted simultaneously.

Figure 17:
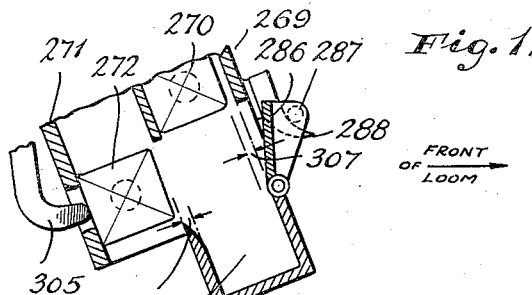
Figure 16:
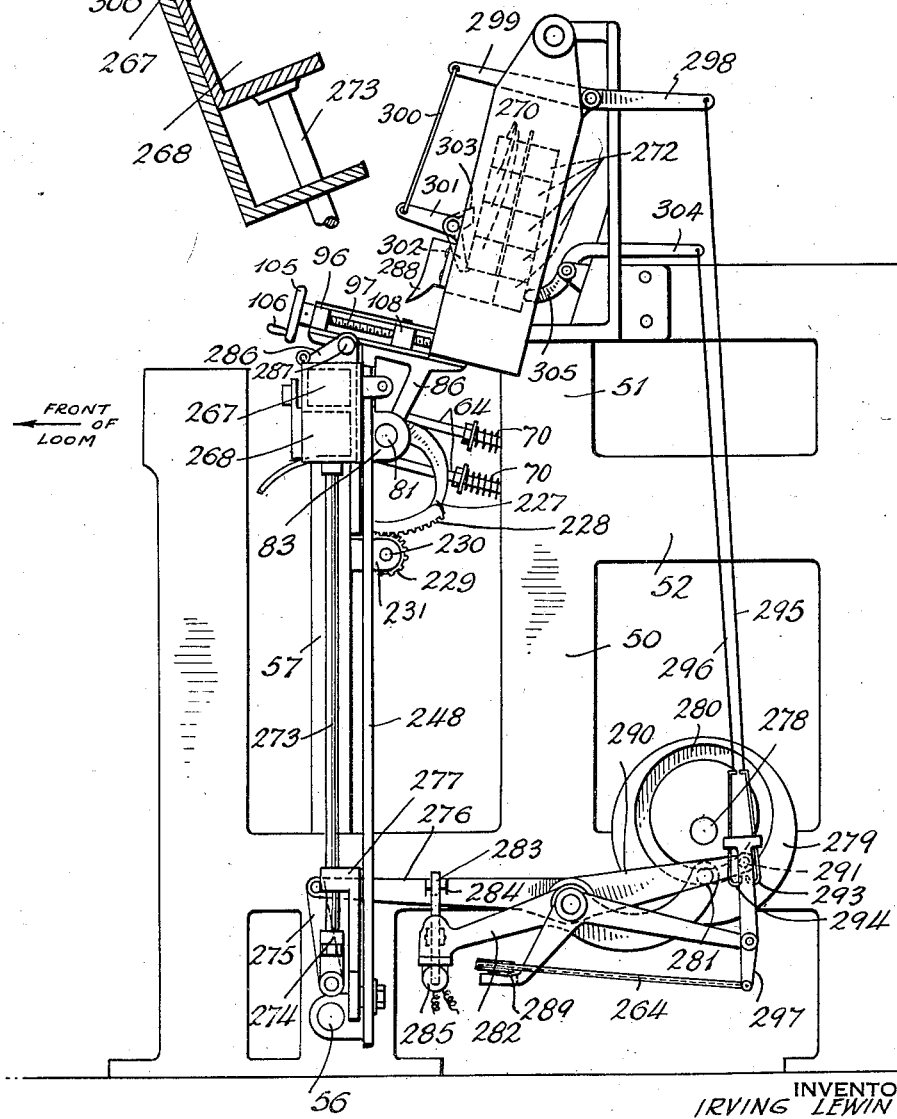

Figures 14 to 17 are diagrammatic showings of an automatic loom illustrating how an automatic loom may be conveniently combined with the adjusting device of the present application, Fig. 14 being a side view illustrating the box motion, Fig. 15 being a front view taken in the direction of the arrow 15 of Fig. 14, Fig. 16 being a side view taken in the direction indicated by the arrow 16 in Fig. 15 and diagrammatically illustrating the shuttle changing mechanism, and Fig. 17 being a diagrammatic enlarged sectional view upon the line 17—17 of Fig. 15 illustrating the cooperation between the shuttle magazines and the shuttle box structure on the lay during the changing operation.

Fig. 18 is a diagrammatic view illustrating the relationship between the eccentric adjusting device and the indicator scale and relative movement of the indicator and the lay structure incidental to such adjustment.

Referring to Figs. 1 to 4, the lay 30 is provided with a reed 31 and is driven so as to reciprocate backwardly and forwardly over its normal range with its foremost position 30f coinciding with the fell of the woven fabric. The warp 32 upon being unrolled from the warp beam 29 against the tension caused by the let-off mechanism diagrammatically indicated by the weights 28 (see Fig. 3) passes over the whip roll 33. The warp 32 is then separated into the sheds 34 by the harness containing the heddles 35.

The warp 32 will pass through the interstices in the reed 31 of the lay 30. While the lay is in backward or rear position, as indicated at 30r in Fig. 1, the flying shuttle (not shown) will be thrown across the shed 34 at position indicated at 27 and then the lay 30 moving forwardly to its foremost position 30f will carry or beat-up the last weft or filling thread 36 left in the sheds 34 up to the fell of the cloth as indicated at 37 in Fig. 1, where it will be properly positioned and uniformly spaced in respect to the previously beat-up filling or weft threads 38.

For each throw of the shuttles the woven fabric or cloth 39 will be advanced or rolled up on the take-up roll 26 over the breast beam 40 (see Fig. 4) a distance equal to one pick, by the production of the ratchet pick wheel 25, with the result that the lay 30 moving from its rearmost to foremost position will beat up each new filling or weft thread to the fell of the cloth where it will be properly spaced from the previously positioned weft or filler thread. From the take-up roll 26 the cloth will pass over the press roll 24 and then finally onto the cloth roll 23.

It will be noted that the lay in its foremost position as indicated at 30f in Fig. 1 will place the filling thread 36 exactly at the fell of the fabric, the last 6 filler or weft threads being shown in properly spaced position.

In Fig. 2 the last four picks as shown in Fig. 1 are removed either on account of breakage of the filling and/or because of the removal of these picks to form a perfect repeat or perhaps to remove a slight imperfection. It will be noted in Fig. 2 that the lay at its extreme forward position will be removed from the fell 37 by a distance equal to four picks.

When this occurs, the loom operator will have stopped the loom, and will thereupon adjust the extreme forward position of the lay and the range of movement of the lay so that it will be in front of its former position by a distance equal to four picks as shown in Fig. 3. It will be noted in Fig. 3 that the lay in its altered forward position as indicated at 30af now will place the last filling thread 36 exactly in proper position at the fell 37 of the woven fabric or cloth.

This method of controlling the beating-up operation to accommodate for lost picks or pick-outs is a substantial advance over the practice ordinarily carried out. According to the old practice it was necessary to release the take-up mechanism, as for example at 25 and 26, and let back the cloth 39 to meet the extreme forward position of the reed 31, as indicated at 30f, to create a new fell position in an effort to effect a perfect joining.

Since in silk looms, particularly broad silk looms, there is no means to automatically wind back the warp 34, upon the warp beam 29, this warp 34 became considerably slack due to the left-back and disturbance in tension. As a result the weaver had to go in back of the loom, had to wind up the warp 32 upon the warp beam and there was no assurance that the tension was the same as before, nor was there assurance that the last picks 36 would be in proper position at the fell 37.

The last picks 36 might have touched the reed, causing the last two picks 38 and 36 to be jammed together, resulting in a "heavy" mark. On the other hand, if the fabric 39 had not been let back sufficiently, a "light" mark would be caused due to the fact that the pick 36 would be spaced farther from the pick 38 than the previous picks 38 from each other.

In addition, according to old practice there was the possibility that the weaver had not brought the lay 30 forwardly to its extreme forward position 30f since this was dependent on the personal skill, touch and eyesight of the weaver.

With the present invention when the range of movement of the lay 30 and its extreme forward position 30f is altered, as shown in Fig. 3, the weaver is able to determine exactly that the new forward position 30af of the lay 30 will be precisely at the fell 37 of the fabric 39 without a resultant "light" mark or "heavy" mark.

During this adjusting operation, the tension of the warp 32 is not disturbed nor is the cloth 39 moved and it is not necessary for the weaver to bring the reed 31 and the lay 30 to their extreme forward positions.

In Figure 4 is shown the effect of shrinkage of the warp as may readily result when the loom stands idle overnight. As shown in Figure 4, the fell 37, due to shrinkage of the warp 34 has moved rearwardly a distance equal to about two picks.

To accommodate this change of position of the fell, according to the present invention, the range of the lay 30 is changed so that it will swing between the positions 30a'f to 30a'r, the former being the altered foremost position of the lay and the latter being the altered rearmost position of the lay. It will be noted that the range of movement from 30f to 30r is the same as from 30a'f to 30a'r, but that the new foremost position of the new beating-up device 31 has been modified to the new position of the fell 37.

The amount of shrinkage as illustrated on Fig. 4 will vary with different warps and fabrics and for each different type of material a different adjustment will be made to accommodate this shrinkage of the fabric. This amount of shrinkage may be readily determined by the experience of the loom operator.

One form of adjusting device, according to the present invention is shown in relatively small scale on Fig. 5 and in detail in Figs. 6 to 13.

Referring to Fig. 5 the loom framework 50 is provided with an upright member 51, with a horizontal member 52 carrying the bearing 53 for the crank shaft 54, and with a leg member 55 carrying the bearing for the lay rocker shaft 56. Connected to the lay rocker shaft 56 is the lay sword 57 upon the upper portion of which is carried the raceway 58 upon which the shuttles travel between the shuttle boxes respectively at the right and the left sides of the lay. One of these shuttle boxes is diagrammatically indicated at 59.

Also carried on top of the lay 30 is the reed 31 which serves to beat up the last weft or filling thread placed in position in the shed 34 by the shuttles to the fell 37. The lay sword 57 as shown in Fig. 5, is in its foremost position with the reed 31 beating the last weft thread up exactly at the fell 37, said weft or filling thread having been placed in position in the shed 34.

The lay 30 is caused to reciprocate between its foremost position 30f and its rearmost position 30r by rotation of the crank shaft 54, said crank shaft being provided with the offset cranks 60. A crank 69 is provided at each side of the lay structure and preferably connected to the lay sword 57 to support and actuate said lay 30 during its beating-up movement. The offset portion 60 which is rotated by the shaft 54 is held between the split sections 61 and 62 which are bolted together as indicated at 63.

The connector rods 64 extend through openings 65 in the flanges 66 of the sections 61 and 62 and at their rear threaded ends they receive the lock nuts 67 which contact with the rear faces of the flanges 66. The rods 64 are also provided with the intermediate threaded portions 68 which receives the nuts 69. The shock absorber springs 70 extend and react between the nuts 69 and the split bearing 61—62, permitting relative movement of the rods 64 through the openings 65 in the split bearing 61—62 thus taking up the shock of any sudden stoppages of the lay 30.

By adjustments of the nut 67 it is possible to make slight adjustments of the normal range 30f—30r of the lay 30 before or when the loom is set up for operation. The forward ends of the rods 64 threaded into the flanges 72 of the split bearing member 73 and are locked thereto by the nuts 71 (see also Fig. 13).

The split bearing element 73 (see Fig. 13) at the front end of the crank connects 64 and embraces a pin 80 provided with the integral end studs 81, which turn within the openings 82 in the ears 83 projecting rearwardly from the lay structure or sword.

As shown in Fig. 18, the small diameter pin 80 is positioned so that it will be tangent to the large stud extensions 81, which project into the openings 82 in the ears 83. Any rotation of the studs 81 will result in an alteration of the foremost position of the stroke of the lay 30 under actuation of the crank shaft 54 and the cranks 60.

The stud extension portion 81 at the left side of the loom (see Fig. 13) is provided with an elongation 84 which passes through and turns within the opening 85 in the frame 86 (see also Fig. 5) of the adjusting device of the present invention. The frame 86 is connected to the rear of the shuttle box structure and the lay frame by the ear 87 and the bolt 88. The adjusting arm 89 (see also Fig. 5) of the adjusting device is provided with a hub 90 embracing the prolongation 84 and fixed thereto by the set screw 91.

It is therefore evident that movement of the arm 89 will result in eccentric movement and resultant adjustment of the pin 80 while the prolongation 84 of the stud 81 moves freely within the bore 85 of the frame 86 of the adjusting device to support said frame 86.

Referring to Fig. 6, the upper end of the frame 86 carries the longitudinal frame member 92 by the bolts 93 (see also Fig. 7). The element 92 takes the form of an inverted L and is provided with a horizontal slide or flange 94.

From the ends of this flange 94, project upwardly the bearing elements 95 and 96, which support and serve as bearings for the threaded rod 97. The bearing element 95 is provided with a bore 98 which receives the rearward extension 99 of the rod 97. This extension 99 is of reduced diameter and is provided with the washers 100 and 101, contacting with forward and rear faces of the bearing 95. The forward end of the threaded rod 97 is received in the opening 102 in the forward bearing member 96.

To the forward extension 103 (see Figs. 6 and 10) of the front end of the rod 97 is fixed the hub 104 of the turn member 105 by the pin 107. This member 105 is provided with the handle 106.

The block 108 (see Figs. 6, 7, 9 and 12) slides at its lower face 109 upon the upper face 110 of the flange 94 of the L-member 92. The upper face 111 of the block 108 is guided by the cover strip 112. This strip 112 is connected at its forward and rearward ends respectively by the bolts 114 to the upstanding bearing members 96 and 95.

The block 108 is longitudinally provided with a tapped bore 113 (see Figs. 7 and 12) which receives the threaded rod 97. Upon turning of the wheel 105 by the handle 106, the rod 97 will be turned within the tapped opening 113 causing the block 108 to move forwardly or rearwardly between the strip 112 and the flange 94 of the L-member 92.

To one side face of the block 108 is connected the L-shaped metal strip 414 (see Figs. 7 and 10) by the screw 115, the horizontal end of the metal strip forming a pointer 116.

The pointer or indicator 116 (see Fig. 10) extends over the scale 117 which may be slid into or out of the receiver 118. The receiver 118 is provided with the inturned edges 119 for holding said strip 117 in position. The ends of the holding strip 118 are provided with the ear extensions 120 which are connected by the screws 121 to the metal strip 112.

The straight edge 122 (see Fig. 10) of the indicator cooperates with the calibration upon the scale 117 so that the loom operator may judge exactly how far to move the wheel 105 to accommodate shrinkage or stretching of the warp pickouts and/or lost picks, each main division upon the scale 117 corresponds to the distance which it is necessary to move the beating-up device, whether the reed 31 or the lay 30 to displace the foremost position of the beating-up device by one pick.

The scale is preferably covered by a transparent strip 123 to protect it (see Figs. 7 and 8).

The side of the block 108 toward the left side of the loom (see Figs. 7 and 12) is provided with a cylindrical stud extension 135, from which projects the threaded member 136 receiving the nut 137. Riding pivotally on the stud 135 is the block member 138 which is retained between the side of the sliding block 108 and the washer 139. The washer 139 is clamped by the bolt 137 against the slotted extension 140 of the arm 89. The block 138 may slide upwardly and downwardly in the slot 141 of said slotted extension 140 incidental to rotation of the eccentric 80—81 of Figs. 13 and 18 by the handle 105.

The forward end of the block 108 (see Figs. 6, 9 and 12) is provided with a cylindrical extension 142 which is serrated at its forward edge to form the ratchet-like teeth 143. These teeth 143 have longitudinal faces on one side and oblique faces on the other side.

The teeth 143 of the extension 142 of the block 108 cooperate with the toothed ring member 144 (see Figs. 6, 9 and 12). The teeth 145 of the cylindrical member 144 also have oblique and straight sides which serve to limit the forward movement of the block by meshing with the teeth 143 of the extension 142 of such block as shown in Figs. 9 and 12.

As is shown in Fig. 12, the toothed ring 144 is received upon the sleeve 146 which has a central opening 147 riding over the threaded rod 97. The forward end of the sleeve 146 is provided with a radial extension or flange 148. The coil spring 149 is held between the ring 144 and the flange 148. The ends of the spring 149 are bent parallel to the axis of the rod 97 and are respectively inserted into the ring 144 and the flange 148, as indicated at 151 and 152 in Fig. 9.

As shown in Fig. 12, the flange 148 is provided with a pin 249 which fits into a slot 150 in the side of the threaded rod 97 (see also Fig. 8).

The ring 144 and the sleeve 146 will turn with the rod 97 upon rotation thereof, due to the connection between the pin 249 and the slot 150. As appears from Fig. 12, slight rotational movement may take place between the ring 144 and the sleeve 146, causing compression or expansion of the spring 149, when the ring 144 is held from rotation by the teeth 143.

The lower end of the flange 148 of the sleeve 146 of Fig. 12 fits into a curved slot 153 in the slide member 154 (see Figs. 6, 8 and 12).

The slide member 154 is provided with a central web member 155 which slides upon the upper surface 110 of the flange 94 and with two depending flanges 156 and 157 which extend downwardly over the sides of the flange 94. The extension 157 of the slide 154 is provided with a lock thumb screw 158. The end of the screw 158 fits in the groove 159 in the side of the L-member 92. This enables the toothed ring 144 to be locked in any convenient position along the threaded rod 97, to limit the forward movement of the pointer 116 so that it will normally be at or returned to its zero position (see Fig. 10).

To the rear extension 99 of the pivot rod 97 is fixed the ratchet wheel 170 by the nut 171 (see Figs. 6, 10 and 11). Cooperating with the ratchet wheel 170 is the pawl 172 which is provided with a pivotal extension 173 pivotally connected at 193 in the clevis 174 of the pivotal arm 175. The pawl 172 is provided with the hand release 202 for disengaging it from the ratchet wheel 170.

The arm 175 is provided with a hub 176 (see Fig. 11) which is fixed upon the pivot rod 177 by the set screw 178. The pivot rod 177 bears in the hub 179 (see Fig. 10) provided with the base 180, which is bolted to the upstanding bearing member 95 at the rear end of the L-member 92. The pivot rod 177 terminates in the fillister-slotted enlargement 181. A coil spring 182 extends between the hub bearing 179 and the enlargement 181 and is fixed at its ends thereto.

The spring 182 tends to turn the arm 175 (see Fig. 11) upwardly against its adjustable stop 183. The stop 183 is threaded through the flange 184 of the bracket member 185 which is connected to the bearing member 95 by the bolt 114 (see also Fig. 10). The threaded adjustable stop 183 may be locked in any convenient position by the lock nut 186.

The movement of the arm 175 away from the threaded adjustable stop 183 is also stopped by the threaded adjustable member 187, which is threaded through the arm 175 and may be locked in position by the lock nut 188 (see particularly Figs. 10 and 11).

The pawl 172 (see Fig. 11) is normally held in contact with the teeth of the ratchet wheel 170 by the spring wire 189 which is turned around the pin 190 on the arm 175 and is clipped over said arm 175 at 191 and over the pawl 172 at 192. The spring 189 stresses the pawl downwardly on its pivot 193, assuring engagement between the end of the pawl 172 and the teeth of the ratchet wheel 170.

To the hub 176 (see Fig. 11) of the arm 175 is connected the threaded stud 194, the end of which is provided with fillister slotted head 195, which retains the roller 196. The roller 196 is adapted to contact with the arm 197 (see Figs. 10 and 11) which arm is adjustably connected in the slot 198 (see Fig. 5) on the plate 199 connected to the side frame member 51 of the loom. The plate 199 (see Fig. 5) is bolted to the side member 51 by the bolts 200 fitting through the slots 201 therein.

In operation, the ring member 144 will be locked in position by the thumb screw 158 so that when the teeth 143 and 145 mesh, as indicated in Fig. 12, the indicating edge 122 of the pointer 116 will be directly over the designation 0, (see Fig. 10).

When there are pickouts or lost picks, the loom will be stopped and the weaver will lift the pawl 172 by actuation of the hand grip 202 connected thereto. This will release the ratchet wheel 170 and permit turning of the wheel 105 by the handle 106. This in turn will rotate the shaft 97, causing movement of the block 108 until the edge 122 of the pointer is above the 1, 2, 3 or 4 calibration lines, indicating that the lay 30 or the reed 31 has been moved through the eccentric arrangement 80—81 of Fig. 18, so that its beating-up position will be displaced forwardly by a distance of 1, 2, 3 or more picks.

When this adjustment has been completed the extreme forward position of the lay and/or of the reed will be in advance of its normal foremost position, so that the new weft threads will be beat-up to the new fell.

It will be noted from a consideration of Figures 9 and 12, that the locked teeth 143 and 145 will readily unlock when the handle 106 is turned to cause the block 108 to move rearwardly on top of the flange 94. The ring 144 will be turned by the sleeve 146 through the spring connection 149. The sleeve 146 is in turn rotated by the engagement of the pin 149 and the slot 150 in the rod 97. This will cause the oblique sides of the teeth 145 to slide off the corresponding oblique portions of the teeth 143, permitting the block to move rearwardly with rotation of the threaded rod 97.

The effect of the adjustment of the pointer 116 upon the range of movement of the beating-up device is most conveniently illustrated in Fig. 18 in which the smaller pin 80 is positioned so that it will be tangent at its upper surface to the stud extensions 81 which project into the ears 83 extending rearwardly from the lay structure, see also Figs. 5 and 13. The position of the eccentric 80—81 as shown in Fig. 18 corresponds to the middle position of the pointer 116 on the scale 117 of Fig. 10.

As indicated diagrammatically in Fig. 18, the range of movement of the pointer 116 over the entire scale 117 indicated by the line 203, would result in a total movement of the lay structure or beating-up device at its point of eccentric connection indicated by the line 204.

Of the total range of movement 203, line 205 represents the available movement to account for the lost picks or pickouts, the corresponding movement of the beating-up device being indicated at 206. The amount of adjusting available in front of the zero mark of Fig. 10 is to prevent a morning mark due to shrinkage of the warp overnight, and is indicated by the line 207 upon the scale and by the distance 208 at the point of eccentric connection between the lay and the stud member 80—81 of Fig. 18.

The scale 117 employed may of course be most conveniently varied depending upon the number of picks per inch and the amount of shrinkage normally occurring in periods of idleness overnight and over weekends.

When an adjustment is to be made to eliminate the morning mark and when the warp has shrunk as indicated in Fig. 4, so that the fell is now one or two picks in rear of its normal position, the thumb screw 158 will be loosened and the sleeve 146 and the ring 144 of Fig. 12 will be moved forwardly by sliding the member 154 along the flange 94 until it reaches a new position which will be one or two picks forward of the normal zero position, as shown in Fig. 10.

Then the loom operator may turn the handle 106 to bring the block 108 and the pointer 116 to the new zero position.

In considering the relative movement at the connection between the crank connector rod 64 and the lay structure 30, the line 209 between the center of the pin 80 and the stud 81 may be considered as a crank with the point 210 thereof fixed in position when the arm 89 and the block 108 with the pointer 116 are moved.

The circle 209a does not correctly illustrate the rotation of the crank, which moves on the center 210, but it is inserted to enable projection of the longitudinal movements 204—206—208 of the beating-up device corresponding to the scale movements 203—205—207.

It is apparent upon rearward movement of the lever 89, the point 211 will be moved forwardly, causing a corresponding forward movement of the reed and of the lay with the result that they will beat-up to a new fell position in advance of the former fell position.

To assure that the rotation of the member 80—81 of Fig. 18 results in a uniform movement of the beating-up device by the spacing of one pick for each scale division of Fig. 10, it is necessary that the spacing of the scale divisions be varied so that the scale divisions in the middle of the scale will be shorter adjacent the middle thereof, as for example the calibration 6, then they will be at the ends thereof, as for example at calibrations 0 or 14. As is apparent from Fig. 18, the same movement along the scale 117 will cause a greater longitudinal displacement of the beating-up device along the line 204 adjacent the calibration 6 in the scale 117, than it would adjacent either end of said scale. The amount of movement on the scale 117 required to move the lay structure the distance of one pick increases therefore as the point of tangency 212 moves away from its top position, as shown in Fig. 18.

Normally when the adjustment has been made to accommodate pickouts or lost picks, it is desirable that the adjusting arm 89 and the block 108 be returned to their normal positions automatically without attention from the loom operator, so that he will have the full number of picks available for any further adjustments. This is readily accomplished by contact of the roller 196 of Figs. 10 and 11 with the arm 197 when the lay reaches its rearmost position, indicated at 30ar in Fig. 3.

This contact upon each reciprocation of the lay 30 between the arm 197 and the roller 196 will cause a downward rotational movement of the arm 175 away from its stop 183 causing the pawl 172 to advance the ratchet wheel 170 by the distance of one tooth. The ratchet wheel 170 as shown, is provided with 30 teeth, and three complete turns of the ratchet 170 will move the pointer 116 a distance backward equal to one pick or over one scale division of Fig. 10. Therefore, for every 90 reciprocations of the lay the block 108 and the pointer 116 will be moved backward toward normal zero position by a distance of one pick or one scale division on the scale 117.

The wire spring 189—191—192 will hold the pawl 192 in engagement with the teeth of the ratchet wheel 170 upon actuating movement of the arm 175 to advance the ratchet wheel 170 one tooth. At the same time the spring will permit the pawl 172 to slide over a tooth of said ratchet when the coil spring 182 of Fig. 10 tends to return the arm 175 upon forward movement of the lay 30, upon which roller 196 is removed from contact with the arm 197.

While the pointer 116 is being returned to its normal zero position the spacing between the picks will be slightly increased by about one-ninetieth of a pick. This, however, is not disadvantageous because of the fact that it is far below the limit of observation. The picks which are beat up during the return of the pointer 116 will appear to the eye even under magnified inspection, as having substantially the same spacing as the remaining picks which are placed in position after the pointer 116 has reached its normal zero location.

The block 108, when being automatically returned, will be stopped from movement when the teeth 143 and 145 interlock. During this rearward movement the teeth 143 of the element 142 will not rotate but the teeth 145 and the ring 144 will be rotated with the shaft 97. When the block 108 reaches the ring 144, the flat faces of the teeth 143 and 145 will come into contact with each other preventing further rotation of the ring 144. Then further movement of the ratchet 170 will turn the flange 148 and the sleeve 146 through the pivot pin 249 and the spring 149, at the same time winding up and compressing the spring 149.

As a result the ratchet wheel 170 will not be advanced a complete tooth, so that the pawl 172 will not click over onto the next tooth. The wound-up spring 149 as soon as the roller 196 is released from the arm 197 consequent to the next forward movement of the lay will turn back the rod 97. Therefore, after the pointer has assumed its normal zero position the rod 97 and the ratchet 170 will be moved each time the roller 196 contacts with the arm 197, but such movement will be reversed, upon release of the roller 196 by the arm 197, by the stressed spring 149 acting through the pin 249 on the rod 97.

To prevent the inertia of the wheel 105 (see Fig. 5) from swinging the rod 97 and the wheel 170 when turned by the pawl 172 a braking means 220 is provided. This consists of a sleeve member 221 having a flange 222 screwed at 223 to the upstanding end member 96 of the L-member 92. The sleeve 221 receives the cylindrical friction element 224 which is pressed against the hub 194 of the wheel 105 by the spring 225, said spring reacting against and being adjusted by the screw 226.

In adjusting the beating-up device, so that the foremost position will be coincident with altered positions of the fell, it is desirable that both sides of the lay 39 be adjusted substantially simultaneously by a single operation of the adjusting device.

One means of attaining this result is shown in Figs. 5 and 13 where the adjusting arm 89 is provided with a curved rack-like extension 227, the toothed bottom portion of which meshes with the pinion 229. The pinion 229 is fixed to the pivot rod 230 extending across the lay. The rod 230 is supported in the bracket or ear 231 extending rearwardly from the lay sword 57. The other side of the loom is provided with a corresponding arrangement of similarly functioning parts, which are designated by the same numerals primed.

It will be noted that the eccentric pin connection 80'—81' at the other side of the loom is substantially identical with that on the right side of the loom, and that the rack 228 upon movement by the arm 89 will rotate the shaft 230, the pinion 229' and the rack 228', causing a corresponding adjustment in the position of the right side of the lay or lay sword 57'.

Figures 14 to 17 show how the adjusting device of the present invention may be most conveniently and satisfactorily combined with an automatic loom structure in which the shuttle boxes, shuttles and/or the bobbins or quills are changed by the operation of the mechanism upon exhaustion of the filler or weft thread therein.

In these automatic looms there is usually a magazine holding the replenished shuttle boxes, shuttles and/or quills or bobbins to be received by the lay and there is in addition another magazine usually positioned at a lower level to receive the exhausted shuttle boxes, shuttles and/or quills or bobbins, when they are replaced by the replenished shuttles from the first-mentioned magazine. The transferring elements for replacing the exhausted shuttle boxes, shuttles and/or quills or bobbins, by the replenished shuttle and/or for removing the bobbins from the exhausted shuttle may be actuated by movement of the lay or in position-relationship in respect to the movement of the lay.

According to the present invention the adjustment of the lay changing its foremost and rearmost positions to accommodate the new fell is so coordinated with the automatic mechanism above described that, even though the total adjustment take place as indicated upon the scale of Fig. 10, nevertheless the automatic mechanism will not be disturbed or deranged and such automatic mechanism will have a margin in respect to its position-relationship which will permit it to accommodate such adjusted position of the beating-up device, either the lay and/or the reed.

Referring to Figs. 14 to 17, the shuttles (not shown) are thrown over across the shed to the right side of the loom by the picker stick 245. The stick 245 is pivotally mounted at 246 on the supporting structure 247 carried by the lay rocker arm 56. The shuttles when received on the right side of the loom are returned to the left side of the loom by the picker stick 248 pivotally mounted at 249 on the structure 250 carried on the lay rocker arm 56.

On the left side of the loom is the double shuttle box 251 having an upper shuttle receiving compartment 252 and a lower shuttle receiving compartment 253, which may respectively receive shuttles containing right twist and left twist threads, whereby a crepe silk fabric may be woven.

The double shuttle box 251 is elevated or lowered by actuation of the rod 254 through the chain 255 passing over the upper puller 256 and the lower pulley 257. The movement of the chain to elevate or lower the double shuttle box 251 so that the proper shuttle will be thrown across the shed by the picker stick 245 is controlled by the box-motion mechanism 258. The box-motion mechanism controls the movement of a chain or rod 259 actuating the chain 255 and elevating or lowering the double shuttle box 251.

The box-motion is actuated from the shaft 260 and through the bevel gears 261 as shown on Fig. 14.

When the rod or chain 259 is moved to change the position of the shuttle box 251, and to change the shuttle which is to be thrown across the shed, the rod 262 is also actuated to lift the lever 263, actuating the chain 264, which rides over the pulley 265 to the other side of the loom. This chain 264 serves to control the replacement of the exhausted shuttle by the proper right twist or left twist shuttle, as the case may be.

The change at the right side of the loom is initiated through closure of the circuit in the box, which is diagrammatically illustrated at 266, one box being provided for each shuttle. The exhausted shuttle in the box 251 causes closure of the circuit actuating the electrical means at the right side of the loom.

On the right side of the loom, as best shown in Figs. 15 to 17, there is a normal shuttle box 267, which alternately receives the right twist shuttle and then the left twist shuttle. When, however, a change of shuttles is to take place, the box 267 will be elevated so that the exhausted shuttle will be received in the lower temporary box 268. The fresh shuttle will be received in the empty elevated box 267 either from the front magazine 269 containing the shuttles 270 of one twist (see Fig. 17), or the rear magazine 271 containing the shuttles 272 of the other twist. The shuttle boxes 267—268 are elevated through the rod 273, when actuated through the collar 274 and the link 275 by the arm 276 (see Figs. 15 and 16). The elevating rod 273 has a guide bearing in the flange 277 connected to the lay rocker end structure 250.

Ordinarily the arm 276 stays in the position of

Fig. 16 and the box 267 will remain in its normal location to receive first the right twist shuttles and then the left twist shuttles, as previously described. When the shuttle is to be changed, however, the arm 276 will be elevated by the arm 282.

The arm 282 is continuously actuated by the loom driving means. Connected to the shaft 278 of the loom structure (see Fig. 16) is the disc 279 having the continuous cam slot 280, in which rides the roller 281 of the arm 282. The arm 282 is provided with a latch 283 which normally remains out of engagement with the tooth 284 on the arm 276.

However, when the shuttle is exhausted, the electrical circuit will be closed at the other side of the loom and will cause energization of the solenoid 285 causing connection between the latch 283 and the tooth 284, elevation of the rod 273 and of the shuttle boxes 267 and 268.

This elevation will occur when the lay is in its forward position and the cover 286 of the upper shuttle box 267 will be lifted by contact between the stud 287 and the cam element 288 on the magazine upon return-movement of the lay. When this occurs, the upper box 267 will be ready to receive one of the replenished shuttles 270 or 272.

The shuttle, which is received, will be controlled by movement of the chain 264 from the left side of the loom extending over the pulley 289.

It will be noted that the left portion 290 of the arm 276 is provided with a pin 291, which upon elevation of the arm 276 by the interconnection of the latch 283—284 will cause said pin to engage either the hook 293 or the hook 294. The arm 276 will then pull downwardly either on the rod 295 or the rod 296, respectively. The engagement between the stud 291 and the hooks 293 and 294 will be controlled by the lever 297, which will move the hooks 293 and 294 from side to side corresponding to the box motion at the left side of the loom.

When one of the shuttles 270 is to be inserted in the elevated box 267, the rod 295 will be pulled down lowering the lever 298. This will actuate the lever 299, the link 300 and the lever 301 to cause the finger 302 to release the lowermost replenishing shuttle 270, which will thereupon drop into the magazine as indicated in Fig. 17. The next higher shuttle 270 will be held by the finger 303 and will be permitted to drop into lowermost position after the change has taken place, and the finger 302 has returned to the position of Fig. 16.

If one of the shuttles 272 on the other hand is to be placed in the elevated shuttle box the rod 296 will lower the lever 304, causing the ejector element 305 to push the lowermost box 272 forwardly, where it will fall into the elevated upper shuttle box 267, as indicated in Fig. 17.

Referring to Fig. 17 the magazine 269—271 is arranged in respect to the upper shuttle box 267 that such exchange will take place properly when there is an amount of displacement in either direction, as indicated by the distances 306 and 307. The tolerances 306 and 307 are preferably arranged to be far in excess of the total range of displacement of the beating-up device as will occur at 204, indicated in Fig. 18. As a result, assurance is had that proper exchange will take place even though the lay be adjusted to accommodate a maximum alteration in the position of the fell, either because of picks and/or because of shrinkage of the warp during idle periods of the loom.

The adjusting device of the present invention may also be most conveniently coordinated with the safety dagger mechanism of looms. The dagger mechanisms are provided to stop the loom if the shuttle has not been received in either left hand or right hand boxes, thus preventing possibility of the shuttle being caught in the shed and being forced up against the fell incidental to the beating-up operation of the lay and/or reed.

As diagrammatically indicated in Fig. 5 the shuttle boxes are provided with the swells 320 which are pressed inwardly by springs (not shown) and outwardly upon reception of the shuttles in the respective right or left hand boxes. When the dagger arm 321 is pressed outwardly upon reception of the shuttle in the box the dagger 322 will be moved downwardly by connection to the shaft 323.

It will be noted, as shown in Fig. 5, with the lay in its foremost position that the dagger 322 does not contact with the bump-off mechanism 324, which will throw out the operating mechanism of the loom and cause stoppage thereof.

However, if the swell is not pressed outwardly due to failure of a shuttle to be received either in the right or left hand box, the dagger 322 will not be lowered and will contact with the throw-out mechanism 324 before the lay has moved up to the fell, so that no serious injury will be caused by the shuttle being retained in the shed.

The relationship between the dagger 322 and the bump-off mechanism 324 is so regulated according to the present invention that, there will be sufficient tolerance between the dagger and the bump-off mechanism that even though the lay be adjusted its full extent according to Fig. 10 there will not be premature bumping off or stoppage of the looom.

It is obvious from the above description that various types of looms, whether they be of the shuttle box, shuttle and/or bobbin or quill changing type may be most readily coordinated with the adjusting device of the present application so that the automatic features may operate without the disadvantageous effect from or because of the adjusting device.

The automatic return mechanism particularly shown in Figs. 5, 6, 10 and 11 may be conveniently modified if desired by replacing the combination of the pawl 172 and the ratchet wheel 170 by a slipping clutch, which will grip a wheel replacing the ratchet 170 to turn it clockwise looking in the direction of Fig. 11, but will slip upon a return movement under the influence of the spring 182. This clutch may be actuated, as shown, by contact by the roller 196 and the arm 197. The arms of the clutch may be provided with resilient connections so that they will break when the block 108 has been returned so that the teeth 143 and 145 will contact, with the result that no further movement of the wheel will take place. It is also desirable that the clutch slips upon the turning of the wheel 106 to adjust the pointer 116 to accommodate a new fell position, in this way eliminating the necessity of the loom operator or weaver reaching back to lift the pawl 172 from the ratchet 170 by manipulation of the handle 202.

With either the pawl and ratchet arrangement, as shown, or the slipping clutch arrangement, it is possible to provide means to lift or remove the arm 175 and the roller 196 from contact with the arm 197 of Fig. 11 after the block 108 has been returned to the normal position, where the beating-up position of the lay will be at the normal fell. This may be done by mechanical means or by electromagnetic means. In the latter case an armature may be provided in conjunction with the element 194 of the arm 175, or with some other part of the arm 175, which will be energized by closure of contacts carried respectively on the block 108 and the member 144. These contacts when brought together will close the circuit which will energize the electromagnet, which will actuate the arm 175 so that the roller 196 will not contact with the arm 197 when the lay has moved to its extreme rearmost position.

If desired, the entire automatic return may be actuated by electromagnetic arrangements with a double contact being carried upon the block 108. The contacts would be closed when the teeth 143 on the block 108 are removed from engagement from the teeth 145 on the ring 144, and at each reciprocation of the lay the solenoid would be energized to actuate its armature in such a way as to cause a return of the pointer 122 a suitable minute fraction of the width of a pick. When the block 108 has returned to its normal rest position the contact would be opened upon engagement of the teeth 143 and 145 and due to contact of a projecting element on the ring 144 with a corresponding projecting element on the block 108.

If desired, the end of the screw 97 might be provided with a gear wheel which could mesh with a worm having an armature extension for a solenoid. The armature would be drawn into the solenoid upon each reciprocation of the lay, causing a return movement of the lay to its normal beating-up position due to the actuation of the worm by the wheel. The return movement of the worm after de-energization of the solenoid and also adjustment of the pointer on the scale to a new fell position, would be accomplished by permitting the worm to move out of mesh with the wheel at these times.

These electrical returning arrangements which do not depend upon a contact between the roller 196 and the arm 197, might be conveniently arranged at the front of the adjusting device in combination with the handle 105—106 so that they may be readily manipulated by the weaver or loom operator.

In a solenoid arrangement such as described for causing a return of the lay to its normal beating-up position by reason of the energization of the solenoid with each reciprocation of the lay, the circuit contact arrangement may be connected to the block 108 or to the collar so that the circuit would be closed when the teeth 143—145 are removed from engagement with each other, and are opened when they again come into engagement.

Referring to Fig. 10 the indicating edge 122 of the pointer 116 might be conveniently moved so that it would be directly above the teeth 143 and the block 154 might also be provided with an indicating pointer, the edge of which would be directly above the teeth 145. In such a case the two pointers may come in direct contact with each other when the lay is returned to its beating-up position, as determined by the position of the ring 144 and by engagement of the teeth 143 and 145.

As previously stated, the adjustment of the present invention might also be accomplished by causing the shuttle boxes 59 or the reed 31 to be adjustable in respect to the lay sword 57. The reed 31 might be provided with carriers at the top and bottom thereof fitting in slots in the lay structure by means of which it might be possible to move the reed backwardly and forwardly either at both its upper or lower edges. Adjusting screws might be provided at both sides of the lay which might be connected by an arrangement shown in Fig. 13 and the reed and/or its bottom edges might be pressed against the adjusting screws by fairly strong springs to prevent any play therein during the beating-up operation. The reed also might be pivotally mounted at its top or its bottom edge with an adjustment at the edge which is not pivotally mounted so as to cause the reed to swing forwardly or rearwardly of its normal beating-up position. It is, however, more satisfactory to adjust the reed as disclosed in the present application so that the reed will always pivot and be at the same angle to the center line of the sword as shown at 30af and 30ar in Fig. 5.

What is claimed is:

1. An adjusting device to control the beating-up operations of looms to accommodate altered fell positions, comprising a lay sword, a lay carried by said lay sword, a crank connector, an adjustable eccentric connection between said sword and connector and automatic means actuated by the movement of the lay to return the lay to its normal beating-up position after adjustment.

2. An adjusting device, comprising a lay sword, a lay carried by said lay sword, a crank connector, adjustable eccentric means for connecting said crank connector to said sword, lever means for adjusting said eccentric means and automatic means actuated by the movement of the lay to return the lay to its normal beating-up position after adjustment.

3. An adjusting device to control the beating-up operations of looms to accommodate altered fell positions, comprising a lay sword, a lay carried by said lay sword, a crank connector, an eccentric pin adjustment connecting said crank connector with the lay sword, a hand lever connected with said pin, an indicating device cooperating with said hand lever and carried by said lay and automatic means to return the lay to its normal beating-up position after adjustment.

4. An adjusting device enabling manual correction of the beating-up operation of looms to change the beating-up position to altered fell positions because of pickouts, lost picks, shrinking and stretching of the warp, comprising a lay structure, a pin comprising a middle portion and two end portions which are eccentric with respect to said middle portion, said end portions being rotatably mounted in said lay structure, a crank connector, means for connecting said crank connector to the middle portion of said pin, an indicator carried by said lay structure, a lever connected with said pin, a pointer member carried by said lever cooperating with said indicator and automatic means to return the lay to its normal beating-up position after adjustment.

5. In a means enabling manual correction of the beating-up operation of looms to change the beating-up position to altered fell positions because of pickouts, lost picks, shrinking and stretching of the warp, a weft beating-up device movable through a range the forward limit of which is the normal fell of the cloth, a driving means for said device, an eccentric connection between said driving means and device adjustable to alter said forward limit and automatic return means actuated by said beating-up operation.

6. In a means enabling manual correction of the beating up operation of looms to change the beating-up position to altered fell positions because of the pickouts, lost picks, shrinking and stretching of the warp, a weft beating-up device movable through a range the forward limit of which is the normal fell of the cloth, driving means for said device and an eccentric connection between said driving means and device adjustable to alter said forward limit, means to maintain said connection in its adjusted position during operation of said device and automatic return means actuated by said weft beating-up device.

7. In a means for making a joining in cloth being woven by controlling the beating-up operation to altered fell positions, a weft beating-up device movable through a range the forward limit of which is the normal fell of the cloth, a driving means connected to said device, an adjusting member located at the point of connection between said driving means and device and operable, through said connection, to alter said forward limit to any one of a plurality of new positions coinciding with a variation in the position of said fell, said adjusting member being provided with a lever and with a manually actuated screw means at the outer end of the lever to enable regulation thereof whereby movement of the last-mentioned end of the lever through a wide range will cause a movement of said member and said device through a relatively small range.

8. In combination with a loom device for making a joining by controlling the beating-up operation to altered fell positions, including means to alter the foremost position of the beating-up device upon alteration of the fell due to lost picks, pickouts, shrinkage and/or stretching of the warp, said means including a driving means for the lay, an eccentric connection for said driving means to said lay, a lever to control said eccentric connection, a screw arrangement to control movement of said lever and a manual actuating means to move said screw.

9. In combination with a loom device for making a joining by controlling the beating-up operation to altered fell positions, including means to alter the foremost position of the lay to altered fell position caused by pick-outs, lost picks, and/or by shrinkage or stretching of the warp, said means including a device for altering the foremost beating-up position of the lay, a screw adjustment for regulating said device, a connecting arm between said screw and said adjusting device, a scale connected to said screw device and an indicator whereby the operator may gauge the amount of adjustment.

10. In combination, with a loom, means for adjusting the foremost position of the reciprocating beating-up device to altered fell positions because of lost picks, pickouts and/or shrinkage or stretching of the warp, said means including means for regulating the foremost position of the beating-up device and means to return the device to its normal position after said adjustment, said last-mentioned means being automatically actuated upon reciprocation of the beating-up device.

11. In combination with a loom of the type provided with a warp beam at one side thereof receiving a warp to be unrolled therefrom, a woven cloth take-up roll at the other side receiving a fabric to be woven from said warp, a plurality of heddles receiving said warp, means for actuating said heddles upwardly and downwardly to form sheds, a lay provided with shuttle receiving boxes at each side thereof, shuttles to be received in said boxes and to traverse the shed to lay a filling or weft thread in position therewithin, said lay also including a weft beating-up device for moving said filler thread after it has been placed in a shed to properly position it at the fell of the fabric, said lay being provided with a driving connection to cause it to reciprocate forwardly and rearwardly means for controlling the beating-up action of said device so that it will properly beat up the weft threads with a changed fell position caused by lost picks, pickouts, stretching and shrinkage of the warp, said means including an adjusting element for changing the range of movement of said device whereby its extreme forward position will be at the fell of the woven fabric, manual means for controlling the adjustment of said element positioned upon the lay in a position readily accessible to the operator of the loom, indicating means enabling exact adjustment of said element and an automatic return effective after said adjustment.

12. An adjusting device to control the beating-up operations of looms to accommodate altered fell positions, comprising a lay sword, a lay carried by said lay sword, a crank connector, an adjustment to regulate the range of beating-up movement of the lay to alter said range so that the foremost beating-up position will be changed to accommodate altered fell positions, and automatic means actuated by the movement of the lay to return the lay to its normal beating-up position after adjustment.

13. An adjusting device, comprising a lay sword, a lay carried by said lay sword, a crank connector, an adjustment to regulate the range of beating-up movement of the lay to alter said range so that the foremost beating-up position will be changed to accommodate altered fell positions, lever means for regulating said adjustment and automatic means actuated by the movement of the lay to return the lay to its normal beating-up position after adjustment.

14. An adjusting device to control the beating-up operations of looms to accommodate altered fell positions, comprising a lay sword, a lay carried by said lay sword, a crank connector, an adjustment to regulate the range of beating-up movement of the lay to alter said range so that the foremost beating-up position will be changed to accommodate altered fell positions, a lever for regulating said adjustment, a block having a pivotal connection to said lever, a guide-way for said block, a screw means for said block extending through said guide-way and means to rotate said screw means.

15. An adjusting device enabling manual correction of the beating-up operation of looms to change the beating-up position to altered fell positions because of pickouts, lost picks, shrinking and stretching of the warp, comprising a lay, an adjustment to regulate the range of beating-up movement of the lay to alter said range so that the foremost beating-up position will be changed to accommodate altered fell positions, and automatic means to return the lay to its normal beating-up position after adjustment including a ratchet, and means to actuate said ratchet when said lay is in rear portion of its stroke.

16. In a means enabling manual correction of the beating-up operation of looms to change the beating-up position to altered fell positions because of pickouts, lost picks, shrinking and stretching of the warp, a weft beating-up device movable through a range the forward limit of which is the normal fell of the cloth, manually actuated adjustable means to alter said forward limit and automatic return means actuated by said beating-up operation.

17. In a means enabling manual correction of the beating-up operation of looms to change the beating-up position to altered fell positions because of the pickouts, lost picks, shrinking and stretching of the warp, a weft beating-up device movable through a range the forward limit of which is the normal fell of the cloth, driving means for said device and a connection between said driving means and a device provided with manually adjustable screw arrangement to alter said forward limit, and automatic return means actuated by said weft beating-up device.

18. In a means for making a joining in cloth being woven by controlling the beating-up operation to altered fell positions, a lay or a weft beating-up device movable through a range the forward limit of which is the normal fell of the cloth, a driving means connected to said device, an adjustment to regulate the range of the beating-up movement of the lay to alter said range so that the foremost beating-up position will be changed to accommodate altered fell positions, a lever for regulating said adjustment, a block having a pivotal connection to said lever, a guideway for said block, a screw means for said block extending through said guide-way and means to rotate said screw means, and automatic return means to return said lay to its normal beating-up position.

19. In combination with a loom, a device for making a joining by controlling the beating-up operation to altered fell positions, including means to alter the foremost position of the beating-up device upon alteration of the fell due to lost picks, pickouts, shrinkage and/or stretching of the warp, said means including a driving means for the lay, an eccentric connection for said driving means to said lay, a lever to control said eccentric connection, a block pivotally connected to the outer end of said lever, a screw arrangement to move said block to control movement of said lever, a guide rail for said block, an indicator strip on said rail, and a manual actuating means to move said screw.

20. In combination with a loom, a device for making a joining by controlling the beating-up operation to altered fell positions, including means to alter the foremost position of the lay to altered fell position caused by pickouts, lost picks, and/or by shrinkage or stretching of the warp, said means including a device for altering the foremost beating up position of the lay, a screw adjustment for regulating said device, a connecting arm between said screw and said adjusting device, a scale connected to said screw device, an indicator whereby the operator may gauge the amount of adjustment, and an automatic return means including a ratchet and pawl arrangement, and means actuating said ratchet and pawl to rotate said screw only during the beating-up operation when adjusting device is being brought back to normal position.

21. In combination, with a loom, means for adjusting the foremost position of the reciprocating beating-up device to altered fell positions because of lost picks, pickouts and/or shrinkage or stretching of the warp, said means including means for regulating the foremost position of the beating-up device and means to return the device to its normal position after said adjustment, said last-mentioned means being automatically actuated upon reciprocation of the beating-up device, and comprising a contact on the loom frame, a reciprocable device upon the beating-up device, said contact and said reciprocable device cooperating upon each rearward reciprocation of the beating-up device, and means actuated by said reciprocable device to return said beating-up device to a predetermined foremost beating-up position.

22. In combination with a loom of the type provided with a warp beam at one side thereof receiving a warp to be unrolled therefrom, a woven cloth take-up roll at the other side receiving a fabric to be woven from said warp, a plurality of heddles receiving said warp, means for actuating said heddles upwardly and downwardly to form sheds, a lay provided with shuttle receiving boxes at each side thereof, shuttles to be received in said boxes and to traverse the shed to lay a filling or weft thread in position therewithin, said lay also including a weft beating-up device for moving said filler thread after it has been placed in a shed to properly position it at the fell of the fabric, said lay being provided with a driving connection to cause it to reciprocate forwardy and rearwardly, means for controlling the beating-up action of said device so that it will properly beat up the weft threads with a changed fell position caused by lost picks, pickouts, stretching and shrinkage of the warp, said means including an adjusting element for changing the range of movement of said device whereby its extreme forward position will be at the fell of the woven fabric, indicating means enabling exact adjustment of said element and an automatic return effective after said adjustment.

IRVING LEWIN.
CONRAD WALTER GEIER.